US006316897B1

(12) United States Patent
Ewing

(10) Patent No.: US 6,316,897 B1
(45) Date of Patent: Nov. 13, 2001

(54) SYSTEM FOR CONTROLLING ADJUSTABLE PEDALS

(75) Inventor: Kip Alan Ewing, Bloomfield Hills, MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/618,415

(22) Filed: Jul. 18, 2000

(51) Int. Cl.[7] ................................ H02P 3/04; G05G 1/14

(52) U.S. Cl. ................................ 318/551; 74/560

(58) Field of Search ................................ 318/551, 255, 318/257; 74/560, 562, 512, 513, 514; 123/399

(56) References Cited

U.S. PATENT DOCUMENTS

| | | | |
|---|---|---|---|
| 2,860,720 | 11/1958 | Huff et al. . | |
| 3,319,487 | 5/1967 | Lystad et al. . | |
| 5,341,894 | 8/1994 | Gorder, Jr. et al. . | |
| 5,460,061 | 10/1995 | Redding et al. . | |
| 5,855,143 * | 1/1999 | Ewing | 74/512 |
| 5,890,399 | 4/1999 | Rixon et al. . | |
| 6,237,565 * | 5/2001 | Engelgau | 74/560 |

* cited by examiner

*Primary Examiner*—Khanh Dang

(57) ABSTRACT

An adjustable pedal system 10 for an automotive vehicle. The system 10 substantially ensures that adjustable pedals 20 are not adjusted when any one or more of the pedals 20 are depressed and/or when the vehicle is being driven.

18 Claims, 3 Drawing Sheets

SYSTEM FOR CONTROLLING ADJUSTABLE PEDALS

FIELD OF THE INVENTION

This invention relates to an adjustable pedal system and more particularly, to a system for controlling adjustable pedals within an automotive vehicle which prevents the pedals from being adjusted while the vehicle is being operated and/or if the pedals are depressed or encounter an obstruction.

BACKGROUND OF THE INVENTION

Adjustable pedal systems or assemblies are used within vehicles, such as automobiles, and allow one or more pedals within these vehicles to be selectively moveable (e.g., extendable and retractable) to satisfy a driver's needs or desires. These systems typically include an adjustment switch and/or controller that is communicatively connected to a motor which receives signals from the controller and which selectively extends or retracts one or more pedals of the vehicle in response to the received signals, thereby moving the pedals toward or away from the driver of the vehicle. In this manner, these conventional systems allow the various pedals of a vehicle, such as the accelerator (e.g. "gas pedal"), brake, and/or clutch pedals, to be selectively and moveably adjusted to suit the size, comfort and/or desire of a particular driver.

While these prior adjustable pedal systems do provide increased comfort and flexibility for drivers, they suffer from some drawbacks. For example and without limitation, these current systems are unable to detect and/or prevent a driver from adjusting the pedals while the vehicle is being driven. This inability of these prior systems may result in several undesirable conditions. For instance, if the pedals are adjusted toward a driver (e.g., extended) and a pedal contacts the driver's foot or another obstruction, the pedal could be depressed to a degree proportional to the amount the pedal continues to be adjusted (e.g., extended) toward the driver, thereby potentially activating or further activating one of the pedal-operated automobile systems or components. These prior systems may cause similar problems if the pedals are retracted or adjusted away from the driver (e.g., the adjustment can cause deactivation of one of the pedal operated systems or components).

There is therefore a need for a system for controlling adjustable pedals within a vehicle which prevents the pedals from being adjusted while the vehicle is being driven and/or if a pedal is being depressed or encounters an obstruction.

SUMMARY OF THE INVENTION

It is a first object of the invention to provide a system for controlling adjustable pedals within a vehicle which overcomes at least some of the previously delineated drawbacks of the prior systems.

It is a second object of the invention to provide a system for controlling adjustable pedals within a vehicle which detects whether any of the pedals are being depressed while the vehicle is being operated and which prevents the pedals from being adjusted in response to such a detection.

It is a third object of the invention to provide a system for controlling adjustable pedals within a vehicle which is adapted to detect when any of the pedals encounter an obstruction while the vehicle is being operated and which ceases adjusting the pedals in response to such a detection.

It is a fourth object of the present invention to provide a system for controlling adjustable pedals within a vehicle which substantially prevents the pedals from being adjusted while the vehicle is being driven.

According to one aspect of the present invention, an adjustable pedal system for use within a vehicle is provided. The vehicle is of the type including an adjustable pedal, an automotive operating element which is selectively activated by a depression of the adjustable pedal, and an electronic component which is selectively activated in response to the activation of the automotive operating element. The system includes a motor which is effective to selectively adjust the pedal; and a controller which is communicatively coupled to the motor and to the electronic component, the controller being effective to monitor the electronic component and to prevent the motor from adjusting the pedal when the component is activated, thereby substantially preventing the pedal from being adjusted while the pedal is depressed.

According to a second aspect of the present invention, a method is provided for controlling a plurality of adjustable pedals within a vehicle of the type including a park gear, a neutral gear and a plurality of automotive operating elements each of which is selectively activated by a unique one of the plurality of adjustable pedals. The method includes the steps of: determining whether the vehicle is in the park or the neutral gear; and adjusting the plurality of adjustable pedals only if the vehicle is in the park gear or the neutral gear, thereby substantially preventing the plurality of adjustable pedals from being adjusted while the vehicle is being driven.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
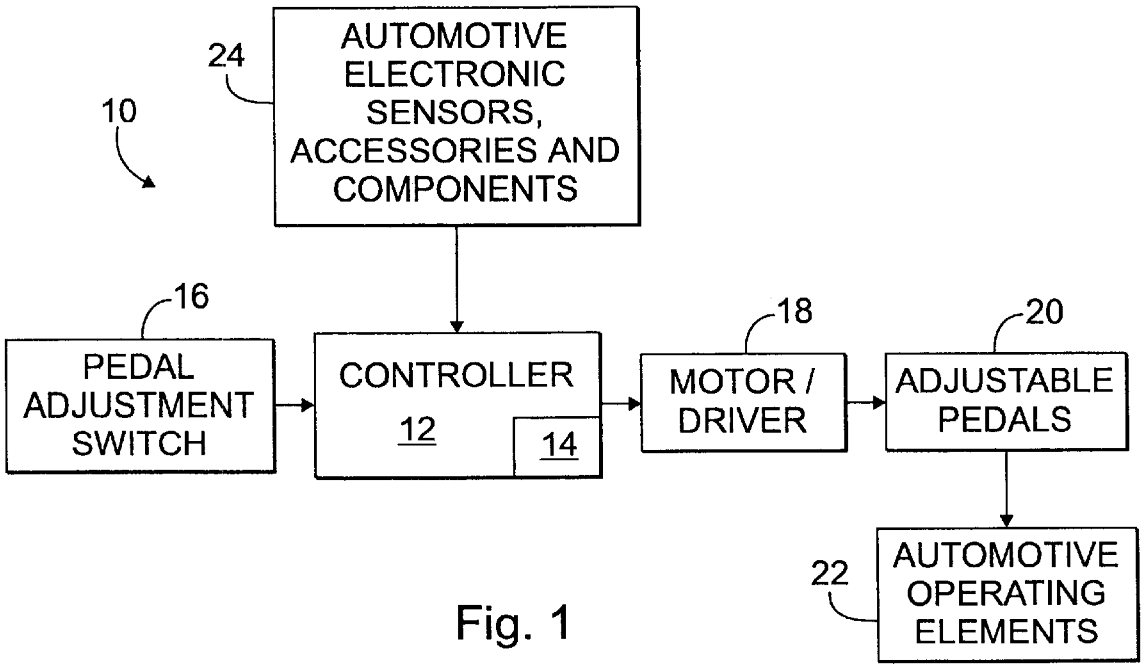
FIG. 1 is a block diagram of an adjustable pedal system which incorporates the teachings of the preferred embodiment of the invention.

Referring now to FIG. 1, there is shown an adjustable pedal system 10 made in accordance with the teachings of the preferred embodiment of the invention. In the preferred embodiment, system 10 is deployed upon a conventional automotive vehicle having various automotive operating elements 22 which are selectively operated by use of one or more power adjustable pedals 20. Automotive operating elements 22 may include any conventional pedal-operated vehicle systems, assemblies or components which allow the vehicle to be operated or driven. For example and without limitation, automotive operating elements 22 may include a conventional throttle, which is selectively operated by use of an accelerator or "gas pedal"; a conventional braking system, which is selectively operated by use of a brake pedal; and a conventional clutch, which is selectively operated by use of a clutch pedal. The vehicle in which system 10 is operatively deployed further comprises various automotive electronic sensors, accessories and/or components 24, which are described more fully and completely below.

System 10 includes one or more conventional power adjustable pedals 20 which are each selectively and independently depressible, effective to activate the automotive operating elements 22. In the preferred embodiment, pedals 20 include an accelerator, a brake pedal and a clutch pedal. In one non-limiting embodiment (e.g., within an automatic transmission vehicle), pedals 20 include only an accelerator and brake pedal. Pedals 20 are selectively extendable and retractable (e.g., toward and away from a driver) and thus allow driver of the vehicle to adjust the position of the pedals to accommodate his or her height, size, or desire. In the preferred embodiment of the invention, pedals 20 selectively adjust (i.e., extend and retract) as a complete unit. In other alternate embodiments, each of pedals 20 is independently adjustable (e.g., each of pedals 20 can be moved without moving the other pedals).

System 10 further includes a controller 12, a pedal adjustment switch 16, and a motor/driver 18 which is operatively coupled to adjustable pedals 20. Controller 12 is a conventional microcontroller having a memory unit 14 and operating under stored program control. Controller 12 is electrically, physically, and communicatively coupled to automotive electronic sensors, accessories, and/or components 24, to pedal adjustment switch 16 and to motor/driver 18. Controller 12 receives and/or monitors signals from components 24 and from pedal adjustment switch 16, and processes and utilizes the received signals to determine how pedals 20 should be adjusted, and based upon this determination, generates a command signal to selectively activate motor/driver 18, thereby selectively adjusting (e.g., extending and/or retracting) pedals 20.

In the preferred embodiment, controller 12 is a conventional microprocessor-based controller having a memory unit 14. In the preferred embodiment of the invention, memory 14 is a conventional memory unit including both permanent and temporary memory, and is adapted to and does store at least a portion of the operating software which directs the operation of controller 12.

Pedal adjustment switch 16 is a conventional selectively positionable electrical switch including several positions corresponding to various pedal adjustment commands. For example and without limitation, in the preferred embodiment, switch 16 includes a pedal extend position, a pedal retract position and a "stop" position. Switch 16 selectively transmits signals to controller 12 which are based upon (e.g., have values corresponding to) the position of the switch 16. These signals are received by controller 12 and used to determine the desired movement of the pedals 20 and to generate a signal to motor 18 to move the pedals 20 in a corresponding manner. In one non-limiting embodiment, switch 16 and controller 12 comprise a single device, unit or module.

Motor/driver 18 comprises a conventional motor unit which receives command signals from controller 12 and which is effective to selectively extend and retract pedals 20 based upon the commands received from controller 12.

In the preferred embodiment of the invention, sensors, accessories and/or components 24 are electrical devices which have a particular electronic characteristic or state (e.g., activated or deactivated) which corresponds to the activation of automotive operating elements 22. In the preferred embodiment, devices 24 include an electronic throttle potentiometer or switch which is activated whenever the throttle is engaged (i.e., whenever the accelerator is depressed). Devices 24 also include a conventional brake light switch, which is activated whenever the brakes are engaged (i.e., when the brake pedal is depressed) ; and a conventional clutch activation switch which is activated whenever the clutch is depressed. Because each of the electronic devices 24 has a particular electronic state which corresponds to the engagement of the automotive operating elements 22, controller 12 is able to determine whether any of the automotive operating elements 22 have been activated by monitoring these devices 24 (e.g., by monitoring the presence of electrical current through these devices). In alternate embodiments, system 10 may include one or more sensors which are effective to determine whether any automotive operating elements 22 are activated or whether any of pedals 20 are being depressed and to communicate a signal to controller 12 in response to such a detection.

In operation, controller 12 continuously monitors devices 24 to determine whether any of the automotive operating elements 22 have been activated. To understand the operation functionality of system 10, reference is now made to block diagram 30 of FIG. 2 which illustrates the method used by the preferred embodiment to control adjustable pedals 20. Diagram 30 begins with functional block or step 32, where controller 12 receives a command signal from switch 16 to adjust (e.g., extend or retract) pedals 20. In functional block or step 34, controller determines whether any of the automotive operating elements 22 is activated by monitoring devices 24. It should be appreciated that by making this determination, controller 12 is able to determine whether any of the pedals 20 (e.g., the accelerator, brake or clutch pedal) is in a depressed condition or state. In alternate embodiments, controller 12 may use one or more sensors to make this determination. If any of the automotive operating elements 22 is activated (i.e., if any of pedals 20 is depressed), controller 12 proceeds to functional block or step 36 and does not execute the adjustment command. If none of the automotive operating elements 22 is activated (i.e., if none of pedals 20 is depressed), controller 12 proceeds to functional block or step 38 and begins executing the command. Particularly, controller 12 communicates a signal to motor/driver 18 effective to cause the motor/driver to either extend or retract pedals 20.

In functional block or step 40, controller 12 continues to monitor devices 24 and determines if any of the automotive operating elements 22 becomes activated during the execution of the adjustment command. It should be appreciated that by making this determination, controller 12 is able to determine whether any of the pedals 20 (e.g., the accelerator, brake or clutch pedal) encounters an obstacle, such as a driver's foot, which is effective to depress the pedal being adjusted. If any of the automotive operating elements 22 becomes activated during adjustment (i.e., if any of pedals 20 are depressed), controller 12 proceeds to functional block or step 42 and immediately stops the pedal adjustment. Particularly, controller 12 communicates a signal to motor/driver 18 effective to stop motor 18 from moving pedals 20. If none of the automotive operating elements 22 becomes activated (i.e., none of pedals 20 becomes depressed), controller 12 completes the adjustment command, as illustrated by functional block or step 44.

It should be appreciated that in the foregoing manner, system 10 substantially ensures that pedals 20 are not adjusted when any one or more of the pedals 20 is depressed. In this manner, system 10 prevents the activation of any of automotive operating elements 22 which may arise from pedal adjustment when the driver's foot or another obstruction contacts the accelerator at any time during an adjustment (i.e., a pedal extension). Furthermore, the present system 10 prevents the deactivation of any of automotive operating elements 22 which may arise during a pedal retraction. By using conventional electronic vehicle devices 24 to detect pedal depression, the present system 10 provides the foregoing benefits without requiring the installation of additional components or devices which are not contained within a conventional pedal adjustment system.

In one alternate embodiment, controller 12 is programmed to allow for a predetermined amount of pedal adjustment during operation of the vehicle. Particularly, controller 12 allows a driver to adjust the pedals 20 so long as the adjustment does not cause the "degree" or "rate" of activation of any of elements 22 to exceed or fall outside of a predetermined range, threshold or bandwith stored within controller 12 and/or memory 14. In this embodiment, controller 12 monitors the "degree" or "rate" that each of elements 22 is activated and allows pedals 20 to be adjusted until the "degree" or "rate" of activation exceeds or falls below a certain value. In this manner, a driver is allowed to adjust the pedals if the driver compensates for the adjustment by altering the position of his or her foot.

In another non-limiting embodiment, controller 12 is communicatively coupled to the vehicle's PARK/NEUTRAL switch which is activated whenever the vehicle is in "PARK" gear or "NEUTRAL" gear. In this non-limiting embodiment, controller 12 does not monitor devices 24, but rather monitors the PARK/NEUTRAL switch. Controller 12 allows pedals 20 to be adjusted (e.g., controller transmits commands from switch 16 to motor 18) only if the PARK/NEUTRAL switch is activated (e.g., only if the vehicle is in PARK or NEUTRAL). Hence, in this nonlimiting embodiment, system 10 substantially prevents the pedals from being adjusted at all times the vehicle is being operated or driven (i.e., at all times the vehicle is in an operating gear, such as DRIVE or REVERSE), regardless of the depression of pedals 20. By disabling the pedal adjustment ability while the vehicle is being driven, this embodiment also provides the foregoing benefits of preventing unintended vehicle surge and/or deceleration.

Figure 3:
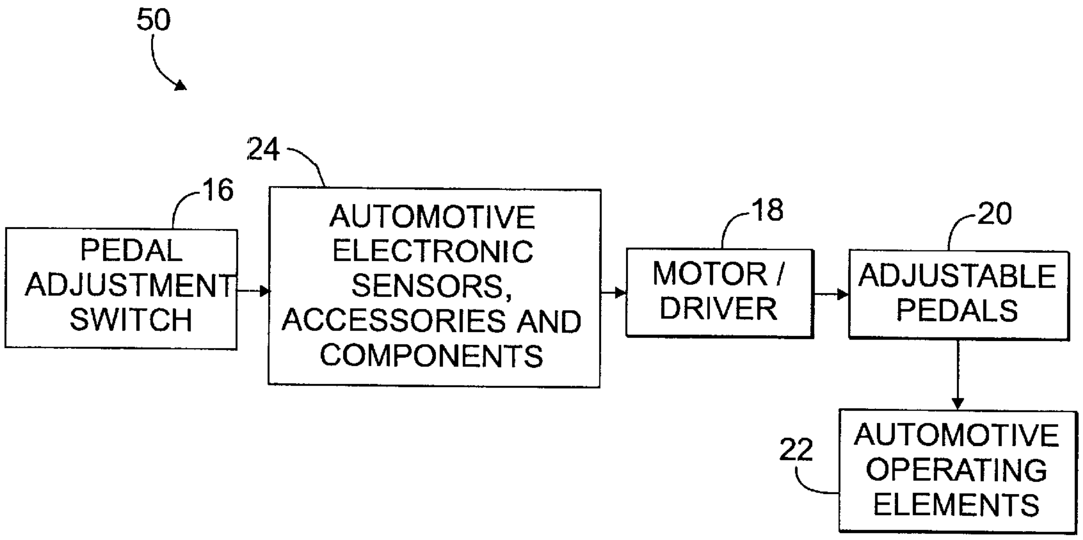
FIG. 3 is a block diagram of an adjustable pedal system which is made in accordance with the teachings of a second embodiment of the invention.

Referring now to FIG. 3, there is shown an adjustable pedal system 50 which is made in accordance with the teachings of a second embodiment of the present invention. System 50 comprises an analog type system in which controller 12 has been eliminated. In system 50, pedal adjustment switch 16 and motor 18 have been wired together with automotive electronics, sensors, accessories and/or components 24. System 50 is wired such that switch 16 is unable to transmit command signals to motor/driver 18 when devices 24 are activated. Particularly, switch 16, devices 24 and motor 18 are wired in a conventional manner such that switch 16 and motor 18 are unable to form a complete circuit if any of the devices 24 are activated. In this manner, system 50 is effective to prevent pedals 20 from being adjusted if any of elements 22 are activated. In one alternate embodiment of system 50, switch 16 and motor 18 are wired together with the vehicle's PARK/NEUTRAL switch in a manner which allows the circuit between switch 16 and motor 18 to be completed only when the PARK/NEUTRAL switch is activated, thereby allowing pedals 20 to be adjusted only when the vehicle is in PARK or NEUTRAL.

Figure 2:
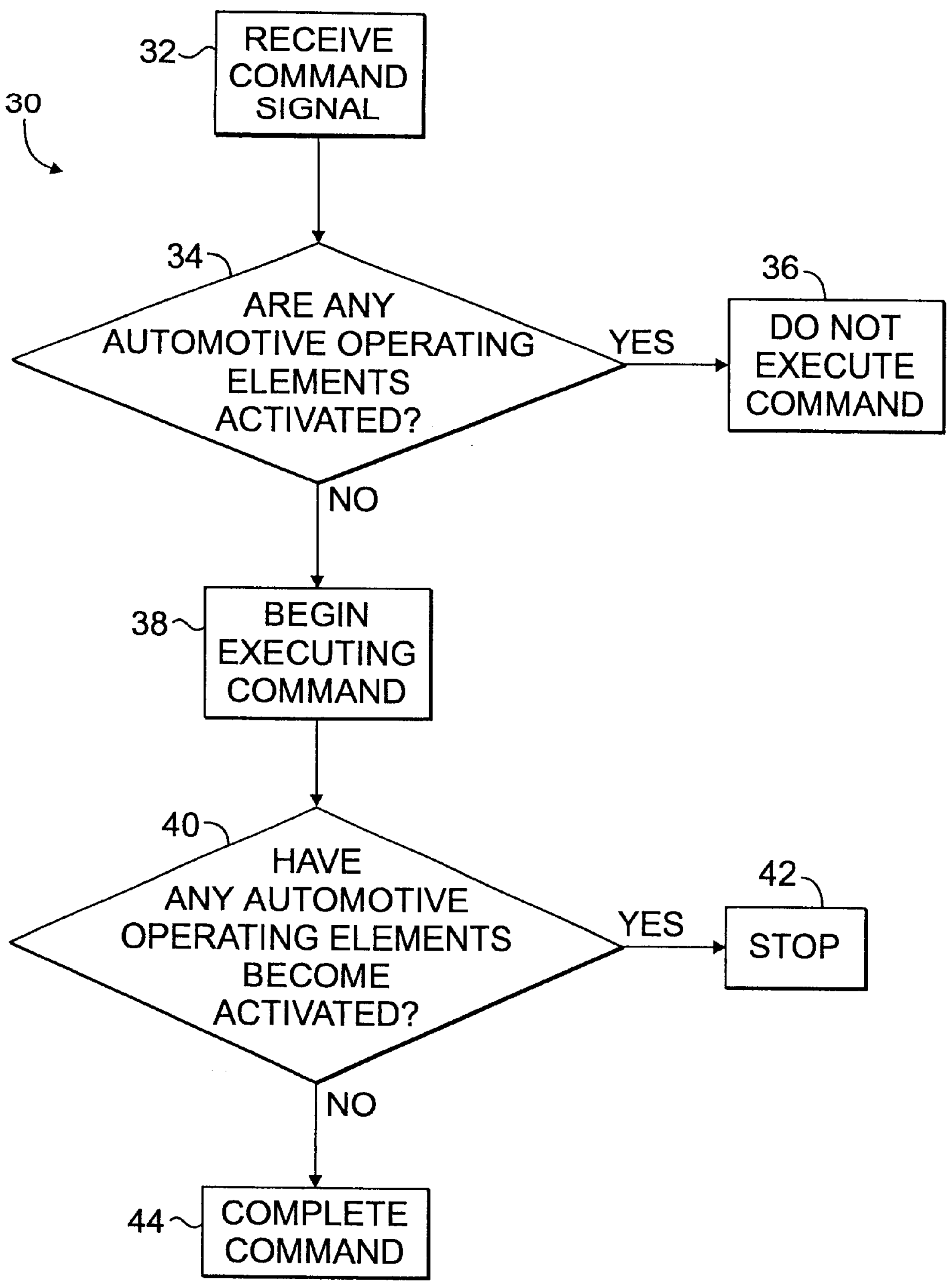
FIG. 2 is a block diagram of a control strategy of methodology used by the system shown in FIG. 1.

It should be appreciated that the block diagrams shown in FIGS. 1, 2, and 3 are for illustrative purposes only and that other types of configurations for systems 10, 50 and/or method 30 may be implemented in alternate embodiments of the present invention. For example and without limitation, the above-described functional steps of method 30 may be performed in a different order or procedure, and may include other additional steps or procedures which are used in conjunction with the functional steps described herein.

It is understood that the various inventions are not limited to the exact construction illustrated and described above, but that these previously delineated inventions may be varied without departing from the scope of the inventions as described in the following claims.

What is claimed is:

1. A system for controlling an adjustable pedal within a vehicle of the type including an automotive operating element which is selectively activated by a depression of said adjustable pedal, and an electronic component which is selectively activated in response to said activation of said automotive operating element, said system comprising:

a motor which is effective to selectively adjust said pedal; and a controller which is communicatively coupled to said motor and to said electronic component, said controller being effective to monitor said electronic component and to prevent said motor from adjusting said pedal when said component is activated, thereby substantially preventing said pedal from being adjusted while said pedal is depressed.

2. The system of claim 1 wherein said automotive operating element comprises a throttle, wherein said pedal comprises an accelerator, and wherein said electronic component comprises a throttle switch.

3. The system of claim 1 wherein said automotive operating element comprises a brake system, wherein said pedal comprises a brake pedal, and wherein said electronic component comprises a brake light switch.

4. The system of claim 1 wherein said automotive operating element comprises a clutch assembly, wherein said pedal comprises a clutch pedal, and wherein said electronic component comprises a clutch activation switch.

5. The system of claim 1 further comprising:

a selectively positionable pedal adjustment switch which is communicatively coupled to said controller and which is effective to generate adjustment command signals which are selectively communicated to said motor by said controller.

6. The system of claim 1 wherein said motor is effective to selectively extend and retract said pedal.

7. A method for controlling a plurality of adjustable pedals within a vehicle of the type including a plurality of automotive operating elements each of which is selectively activated by a depression of a unique one of said plurality of adjustable pedals, said method comprising the steps of:

determining if any of said plurality of automotive operating elements has been activated; and adjusting said plurality of adjustable pedals only if none of said plurality of automotive operating elements has been activated, thereby substantially preventing said plurality of adjustable pedals from being adjusted while any of said plurality of adjustable pedals is depressed.

8. The method of claim 7 wherein said determination if said plurality of automotive operating elements has been activated is performed by use of at least one sensor.

9. The method of claim 7 wherein said vehicle further comprises a plurality of electronic components each of which changes from a first electrical state to a second electrical state in response to activation of a unique one of said plurality of automotive operating elements, and wherein said determination if any of said plurality of automotive operating elements has been activated is performed by monitoring said plurality of electronic components.

10. The method of claim 7 wherein said plurality of automotive operating elements comprises a throttle, wherein said plurality of adjustable pedals comprises an accelerator, and wherein said plurality of electronic components comprises a throttle switch.

11. The method of claim 10 wherein said plurality of automotive operating elements further comprises a brake system, wherein said plurality of adjustable pedals further comprises a brake pedal, and wherein said plurality of electronic components further comprises a brake light switch.

12. The method of claim 11 wherein said plurality of automotive operating elements further comprises a clutch assembly, wherein said plurality of adjustable pedals further comprises a clutch pedal, and wherein said plurality of electronic components further comprises a clutch activation switch.

13. A method for controlling a plurality of adjustable pedals within a vehicle of the type including a park gear, a neutral gear and a plurality of automotive operating elements each of which is selectively activated by a unique one of said plurality of adjustable pedals, said method comprising the steps of:

determining whether said vehicle is in said park gear or said neutral gear; and adjusting said plurality of adjustable pedals only if said vehicle is in said park gear or said neutral gear, thereby substantially preventing said plurality of adjustable pedals from being adjusted while said vehicle is being driven.

14. The method of claim 13 wherein said determination if said vehicle is in said park gear or said neutral gear is performed by monitoring a park/neutral switch within said vehicle.

15. The method of claim 14 wherein said plurality of adjustable pedals is selectively adjusted by use of a motor.

16. The method of claim 13 wherein said plurality of automotive operating elements comprises a throttle and wherein said plurality of adjustable pedals comprises an accelerator pedal.

17. The method of claim 16 wherein said plurality of automotive operating elements further comprises a brake system, and wherein said plurality of adjustable pedals further comprises a brake pedal.

18. The method of claim 17 wherein said plurality of automotive operating elements further comprises a clutch assembly, and wherein said plurality of adjustable pedals further comprises a clutch pedal.

* * * * *